(12) United States Patent
Hua et al.

(10) Patent No.: US 8,551,599 B2
(45) Date of Patent: Oct. 8, 2013

(54) RECONFIGURABLE MICROACTUATOR AND METHOD OF CONFIGURING SAME

(75) Inventors: Zhishan Hua, Raleigh, NC (US); Erdogan Gulari, Ann Arbor, MI (US); Mark A. Burns, Ann Arbor, MI (US); Rohit Pal, Fishkill, NY (US); Onnop Srivannavit, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 927 days.

(21) Appl. No.: 12/551,071

(22) Filed: Aug. 31, 2009

(65) Prior Publication Data

US 2010/0055394 A1 Mar. 4, 2010

Related U.S. Application Data

(60) Provisional application No. 61/093,866, filed on Sep. 3, 2008.

(51) Int. Cl.
*B32B 3/24* (2006.01)
*B32B 3/26* (2006.01)
*F16K 7/12* (2006.01)
*F16K 7/17* (2006.01)
*F16K 31/02* (2006.01)
*F16K 31/126* (2006.01)
*B81C 1/00* (2006.01)

(52) U.S. Cl.
USPC .............. 428/138; 428/68; 428/72; 428/137; 428/172; 428/913; 422/68.1; 137/67; 137/74; 137/825; 137/828; 137/829; 251/11; 251/61; 251/129.01; 251/129.06

(58) Field of Classification Search
None
See application file for complete search history.

(56) References Cited

U.S. PATENT DOCUMENTS

| | | | | |
|---|---|---|---|---|
| 5,325,880 | A * | 7/1994 | Johnson et al. | 137/1 |
| 5,346,372 | A * | 9/1994 | Naruse et al. | 417/379 |
| 6,929,030 | B2 * | 8/2005 | Unger et al. | 137/883 |
| 2002/0037221 | A1 * | 3/2002 | Mastrangelo et al. | 417/10 |
| 2003/0057391 | A1 * | 3/2003 | Krulevitch et al. | 251/11 |
| 2004/0094733 | A1 * | 5/2004 | Hower et al. | 251/11 |
| 2005/0284627 | A1 * | 12/2005 | Riley et al. | 166/250.01 |
| 2007/0020589 | A1 * | 1/2007 | Smith et al. | 434/113 |
| 2010/0093559 | A1 * | 4/2010 | Fan et al. | 506/9 |

FOREIGN PATENT DOCUMENTS

| | | | |
|---|---|---|---|
| GB | 2400158 A | * | 10/2004 |
| WO | WO 2008004572 A1 | * | 1/2008 |
| WO | WO 2008049413 A2 | * | 5/2008 |

OTHER PUBLICATIONS

Shaikh et al., Design and Development of a Portable Microfluidic System for Medical Diagnostics, 2007 (no month given), pp. 36-56 & 74-75.*

(Continued)

*Primary Examiner* — David Sample
*Assistant Examiner* — Jeff Vonch
(74) *Attorney, Agent, or Firm* — Brooks Kushman P.C.

(57) ABSTRACT

A microactuator may be configured by activating a source of electromagnetic radiation to heat and melt a selected set of phase-change plugs embedded in a substrate of the microactuator, pressurizing a common pressure chamber adjacent to each of the plugs to deform the melted plugs, and deactivating the source of electromagnetic radiation to cool and solidify the melted plugs.

9 Claims, 3 Drawing Sheets

(56) References Cited

OTHER PUBLICATIONS

Daniel Baechi, Rudolf Buser, Jurg Dual, "A high density microchannel network with integrated valves and photodiodes", Sensors and Actuators A 95 (2002) Elsevier Science B.V., pp. 77-83.

Chung-Cheng Lee, et al., "Multistep Synthesis of a Radiolabeled Imaging Probe Using Integrated Microfluidics", Science, vol. 310 (Dec. 16, 2005); pp. 1793-1796.

William H. Grover and Richard A. Mathies, "An integrated microfluidic processor for single nucleotide polymorphism-based DNA computing", Lap Chip, 2005, 5, pp. 1033-1040.

William H. Grover, et al., "Monolithic membrane valves and diaphragm pumps for practical large-scale integration into glass microfluidic devices", Sensors and Actuators B 89 (2003), Elsevier Science B.V., pp. 315-323.

Wei Gu, et al., "Computerized microfluidic cell culture using elastomeric channels and Braille displays", PNAS, Nov. 9, 2004, vol. 101, No. 45, pp. 15861-15866.

Jong Wook Hong, et al., "A nanoliter-scale nucleic acid processor with parallel architecture", Nature Biotechnology, vol. 22, No. 4, Apr. 2004, pp. 435-439.

Robin Hui Liu, et al., "Self-Contained, Fully Integrated Biochip for Sample Preparation, Polymerase Chain Reaction Amplification, and DNA Microarray Detection", Analytical Chemistry, vol. 76, No. 7, Apr. 1, 2004, pp. 1824-1831.

Rohit Pal, et al., "Phase Change Microvalve or Integrated Devices", Analytical Chemistry, vol. 76, No. 13, Jul. 1, 2004, pp. 3740-3748.

Jong-Myeon Park, et al., "Multifunctioal microvalves control by optical illumination on nanoheaters and its application in centrifugal microfluidic devices", Lab Chip, 2007, 7, pp. 557-564.

Shinji Sugiura, et al., "Size control of calcium alginate beads containing living cells using micro-nozzle array", Biomaterials 26 (2005), pp. 3327-3331.

Todd Thorsen, et al., "Microfluidic Large-Scale Integration", Science, vol. 298, Oct. 18, 2002, pp. 580-584.

Nelsimar Vandelli, et al., "Development of a MEMS Microvalve Array for Fluid Flow Control", Journal of Microelectromechanical Systems, vol. 7, No. 4, Dec. 1998, pp. 395-403.

Bozhi Yang, Qiao Lin, "A latchable microvalve using phase change of paraffin wax", Sensors and Actuators A 134 (2007), Elsevier B.V, pp. 194-200.

Ming Yang, Rohit Pal, and Mark A. Burns, "Cost-effective thermal isolation techniques for use on microfabricated DNA amplification and analysis devices", Journal of Micromechanics and Microengineering, 15, (2005), pp. 221-320.

* cited by examiner

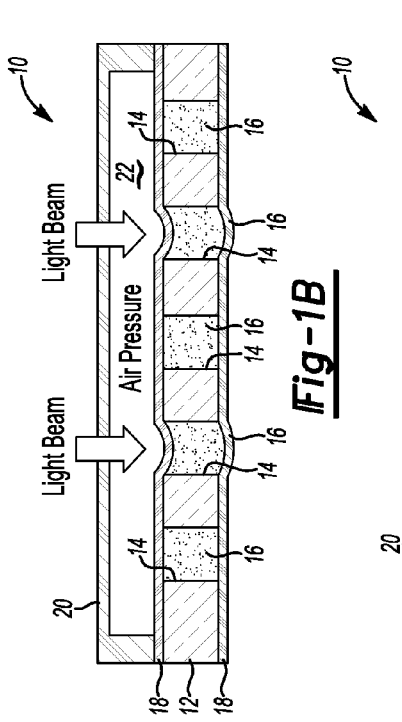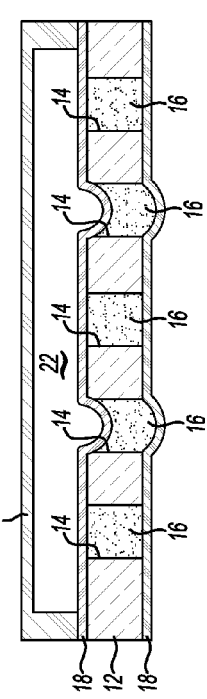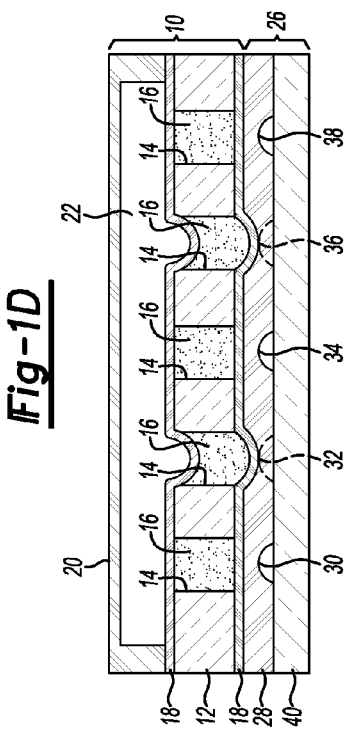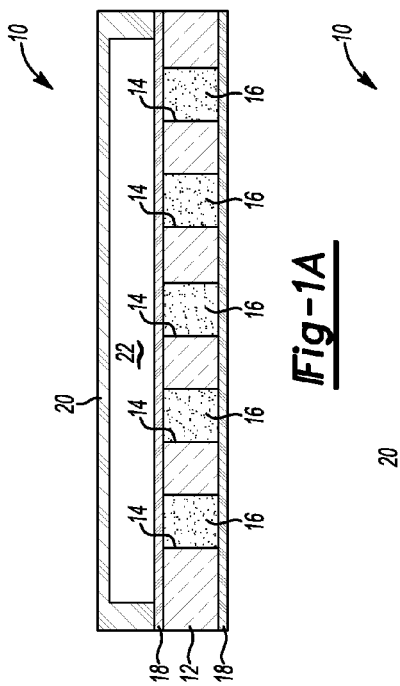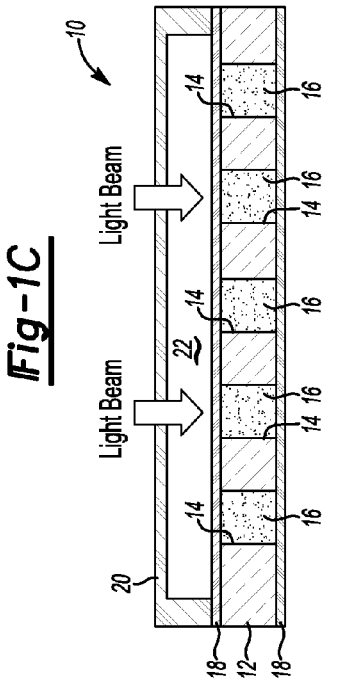

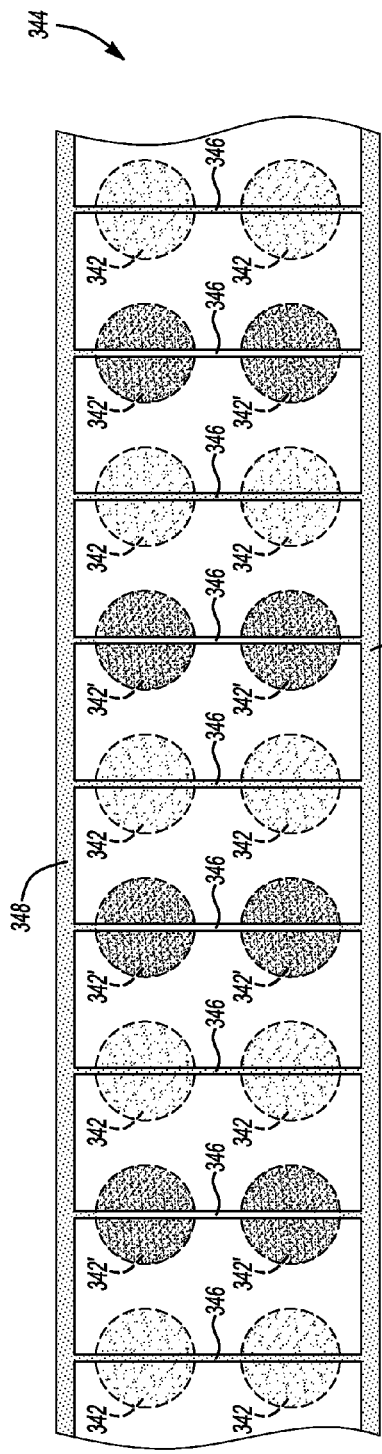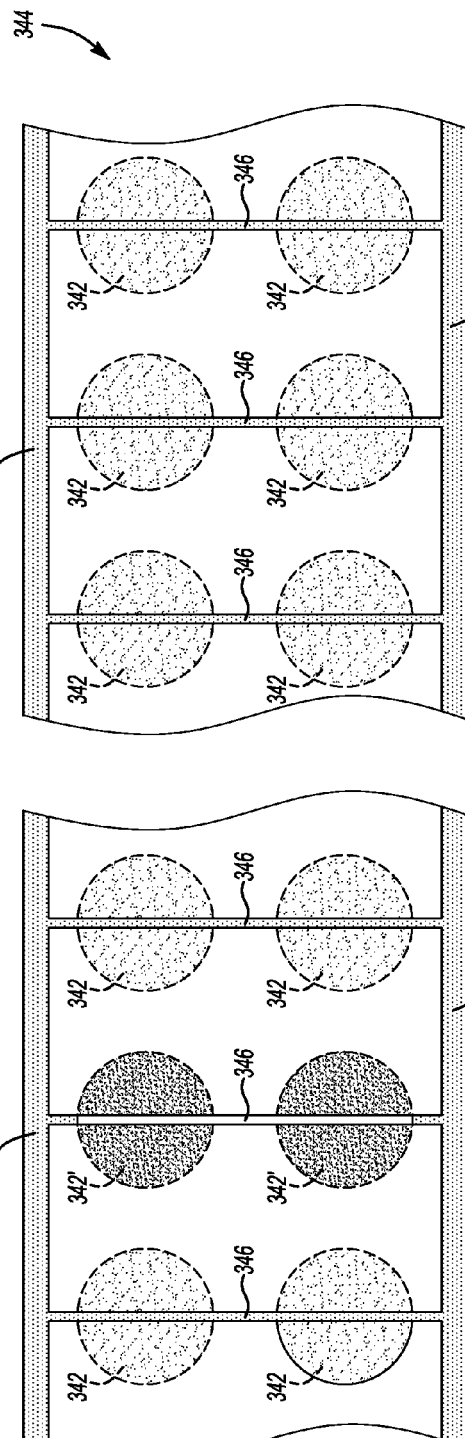

RECONFIGURABLE MICROACTUATOR AND METHOD OF CONFIGURING SAME

CROSS-REFERENCE TO RELATED APPLICATION

This Application claims the benefit of U.S. Provisional Application No. 61/093,866, filed Sep. 3, 2008, of which pages 1 through 11 and FIGS. 1 through 5 are hereby incorporated by reference.

STATEMENT REGARDING FEDERALLY SPONSORED RESEARCH OR DEVELOPMENT

This invention was made with government support under RR018625, HG003725 and GM068564 awarded by the National Institutes of Health and BES0428010 awarded by the National Science Foundation. The government has certain rights in the invention.

BACKGROUND

There has been a trend towards the integration of single microfluidic elements such as microvalves and micropumps into complex microfluidic networks for highly parallel, miniaturized, and integrated chemical/biomedical processes. Successful examples include integrated microfluidic circuits, microfluidic processors, and microvalve arrays. Generally, fluidic manipulations in these devices are achieved by physical displacement/deflection of an array of elastic structures using pneumatic, electrostatic or thermal pneumatic actuation. Pressure channels or electrical lines are used to deliver actuation signals to individual units in the array. The integrated devices therefore require a large number of external supporting equipments, such as solenoid valves and tubing connections as well as electrical modules and associated multiplexing programs. Also, these peripherals cannot scale down accordingly with the microfluidic chip. They consume considerable space and limit the use for portable applications. Therefore, a microfluidic platform with simple actuation and multiplexing mechanism would be desirable for microfluidic integration.

SUMMARY

A microactuator system may include a substrate having a plurality of thru chambers formed therein, a plurality of phase-change plugs each disposed within one of the thru chambers, a flexible layer attached with the substrate and covering a surface of each of the plugs, and a cap positioned such that a common pressure chamber is defined adjacent to each of the plugs.

A microactuator system may include a substrate assembly having a plurality of actuation cells embedded therein and a helmet chip operatively arranged with the substrate assembly to form a common pressure chamber adjacent to the actuation cells. Each of the actuation cells may be configured to melt if heated by a source of electromagnetic radiation and to deform when melted if subjected to pressure.

A microactuator may be configured by activating a source of electromagnetic radiation to heat and melt a selected set of phase-change plugs embedded in a substrate of the microactuator, pressurizing a common pressure chamber adjacent to each of the plugs to deform the melted plugs, and deactivating the source of electromagnetic radiation to cool and solidify the melted plugs.

While example embodiments in accordance with the invention are illustrated and disclosed, such disclosure should not be construed to limit the invention. It is anticipated that various modifications and alternative designs may be made without departing from the scope of the invention.

BRIEF DESCRIPTION OF THE DRAWINGS

FIGS. 1A through 1E are side views, in cross-section, of an embodiment of a microactuator system.

FIG. 2 is a side view, in cross-section, of the microactuator system of FIG. 1 integrated with an embodiment of a microfluidic channel assembly.

FIGS. 6A through 6C are plan views of a ladder channel network configured by a microactuator.

DETAILED DESCRIPTION

Figure 3A:
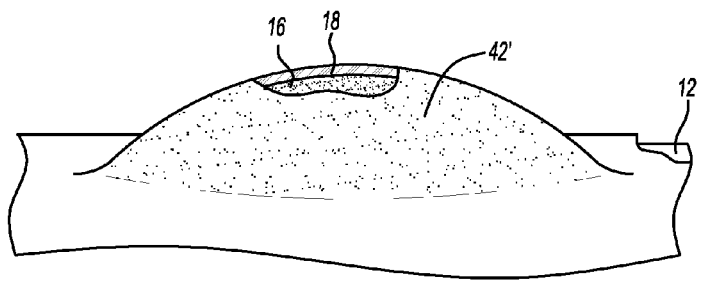
FIGS. 3A and 3B are close-up perspective views of an embodiment of an actuator element.

Optically addressed microactuator arrays (microfluidic "flash memory") are described herein. Analogous, in certain circumstances, to the address-data bus mediated memory address protocol in electronics, these microactuator arrays may include individual phase-change based actuator elements addressed by localized heating through, for example, electromagnetic radiation (address bus). This electromagnetic radiation (e.g., microwaves, infrared radiation, visible light, X-rays, etc.) may be provided by a modified projector or high power laser pointer. The phase-change media (e.g., wax, gel, polymer, an alloy with a melting point less than 100° C., etc.) may be fully encapsulated and thus immune from contamination in fluidic environments.

A common pressure manifold (data bus) for a portion of/the entire array may be used to generate deflections of the phase-change actuator elements in the molten phase. The use of a phase-change material as the working media enables latched operation of the actuator. After the initial light "writing" during which the phase is temporarily changed to molten, the actuated status is self-maintained by the solid phase of the actuators without power and pressure inputs. These microfluidic flash memories can be reconfigured by a new electromagnetic radiation pattern and common pressure gradient.

This approach can achieve actuation of arbitrary units in a large-scale array without the need for complex external equipment such as solenoid valves and electrical modules, which may lead to significantly simplified system implementation and compact system size. Certain array embodiments described herein, therefore, may provide a flexible, energy-efficient and low cost multiplexing solution for microfluidic applications based on physical displacements. As an example, the use of a latched microactuator array as "normally closed" or "normally open" microvalves is discussed below.

Referring to FIGS. 1A through 1E, an embodiment of a microactuator array assembly 10 is illustrated. A microchip 12 (e.g., glass, plastic, etc.) may contain an array (arranged in any suitable pattern) of round chambers 14 (or passageways) each filled with, for example, a mixture of wax and carbon powder 16. Of course, the chambers 14 may have any suitable shape (e.g., square, oval, frustoconical, etc.) In the embodiment of FIGS. 1A through 1E, each of the chambers 14 is completely filled with the mixture 16. In other embodiments, each of the chambers 14 may be partially filled with the mixture 16 such that the mixture 16 spans the area of the chambers 14 (e.g., spans the round cross-section of the chambers 14 of FIG. 1) but is recessed within the chambers 14. One or both sides of the chip 12 may be covered with membranes 18 (e.g., PDMS or other flexible materials), which may be impermeable to the phase-change media 16. Another helmet chip 20 may be arranged with the actuator chip 12 to form a closed fluid chamber 22 adjacent to the microchip 12 and wax plugs 16.

Actuation, in this embodiment, is based on light-induced phase-change of the wax 16 and fluid pressure (e.g., pneumatic pressure). When light beams are delivered onto the microchip surface, the illuminated wax plugs 16 are heated by light energy (and melt). If fluid pressure (e.g., air pressure) is supplied into the chamber 22, the flexible membranes 18 covering the melted wax plugs 16 deflect by the pressure transported by the liquid wax 16. After actuation, the light is removed but the pressure is kept until the melted wax plugs 16 cool and solidify. Then the pressure can be released and the actuated units 16 retain their deflected shape. This deflection can be simply erased by a second illumination without applying pressure. Therefore the actuation status of the entire array assembly 10 is self-maintained after the initial light "writing" without any energy or force, and can be rewritten by additional light illumination.

A single pressure source is used for all the units 16 in the array assembly 10. This pressure is only "written," however, into the illuminated (addressed) locations. In other embodiments, multiple chambers 22 may be formed as desired with the use of, for example, additional helmet chips 20.

Such a device may be analogous to the address/data bus mediated flash memory which stores data without power. This light addressing approach may eliminate the need for built in electrical heaters, complex tubing, channels and solenoid valves. Light illumination creates "virtual heaters" at target locations without requiring on-chip electrical components. The device fabrication and system implementation may thus be significantly simplified.

Referring to FIG. 2, the array assembly 10 is integrated with an embodiment of a PDMS microfluidic channel assembly 26. The channel assembly 26 may include a PDMS membrane 28 having channels 30, 32, 34, 36, 38 formed therein, and a substrate 40 sealed against the membrane 28. The channels 30, 32, 34, 36, 38 may take any suitable shape. Channel shapes other than concave, however, may not be completely sealed by actuation of the array assembly 10. Other microfluidic devices, of course, may also be used. The channels 32, 36 are shown closed.

Example microactuator arrays were fabricated from plastic and glass substrates. To fabricate the plastic device, an array of chambers was first hot-embossed into a 2 mm thick cycloolefin copolymer substrate (Zeonex 480, Tg=138° C., Zeon Chemicals, Louisville, Ky.) using an aluminium mold at 150° C. and 20 psi. These chambers were next filled with a mixture of melted wax (VYBAR 260, Baker Petrolite Polymers Division, Sugar Land, Tex.) and carbon powder. Then, 60 µm PDMS thin films (Sylgard 184, Dow corning) were bonded onto both sides of the actuator chip. An oxygen plasma surface treatment on both COC and PDMS surfaces, and oven baking at 120° C. were applied to achieve good PDMS/COC bonding. Finally, this actuator chip was glued with another plastic cap containing a hot-embossed chamber.

The fabrication of the glass device was by way of standard glass wet etching. First, 300 A°/5000 A° Cr/Au was coated on both sides of a 500 µm thick 4-inch Borofloat glass wafer by e-beam evaporation and patterned using photolithography and Cr/Au etchants. Next, the glass wafer was etched in 49% HF solution from both sides until through-wafer holes were formed. Then, the remaining photoresist and Cr/Au mask were removed. Finally, the etched glass chip was loaded with wax and sealed by PDMS membranes using the same procedure for the plastic actuator array.

This process is more complex than the plastic fabrication, but glass substrates may offer better rigidity and dimensional stability. The glass-based actuator array chip can therefore be made thinner and achieve faster actuation.

In some situations, high integration density is a desirable feature for microfluidic network devices. Certain microactuator arrays described herein are based on the phase-change of wax material. Thermal diffusion may be the major limitation for packing density.

To avoid thermal crosstalk and unwanted actuation, it may be necessary for non-active cells to maintain a temperature lower than 320 K everywhere in the cells. To achieve this, the space between two adjacent cells may need to be 500 µm or more (based on simulation results). Assuming a phase-change media cell minimum diameter of 550 µm on a 500 µm thick glass chip (due to limitations of wet etching), the maximum theoretical array density for the actuator array, based on steady state heat diffusion, is close to 100 cells/cm$^2$. This density is a conservative estimate because it is based on steady state heat diffusion. In real operation, however, the phase-change media plug is deformed when it is melting and light illumination will be removed before the heat transfer reaches steady state equilibrium.

The maximum array density can be further increased using more advanced glass micromachining techniques such as sand-blasting and laser-drilling to eliminate undercut-caused loss of effective surface area. In addition, fabricating heat isolation trenches between neighbouring cells has proved to be an effective approach to suppress heat diffusion and allow higher packing density. Based on these considerations, an array density of upwards of 1000 cells/cm$^2$ is expected.

Two types of light sources were used to generate localized heating on the microactuator arrays described above. A computer-controlled digital projector (Infocus X2) was used to generate reconfigurable "virtual heaters." The original projection lens was replaced by a convex lens to converge the light beams to the size of the microchips. The microchips were placed at the focal plane using an adapter.

The projector had a SVGA (800×600) resolution. This resolution is far greater than the number of individual units involved in the example microfluidic arrays but could not be converted to thermal resolution due to lateral heat diffusion over the microchips. Substrates with low thermal conductivity may be required to achieve considerable array density.

Alternatively, a battery-operated high power laser pointer (100 mW, 635 nm, WickedLaser) was used as a simplified solution. A small convex lens was attached at the end of the laser pointer to further converge the light beam which was then manually aligned to target units on the actuator array. This provided an extremely handy and flexible way to operate the microactuator array. Any suitable electromagnetic radiation source, however, may be used.

Figure 3B:
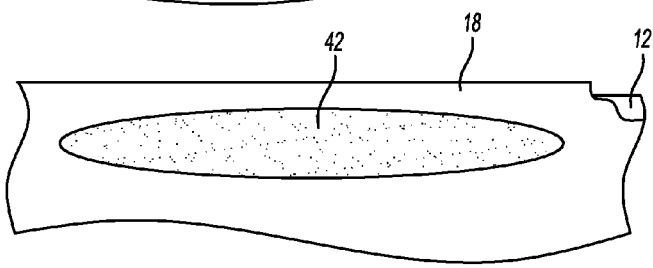

Referring to FIGS. 3A and 3B, the operation of a single actuator unit is shown. (When actuated as in FIG. 3A, the actuator unit is labelled 42'. When de-actuated as in FIG. 3B, the actuator unit is labelled 42.) A digital projector was used to provide the light beams (address bus) to melt the phase-change actuator. The pressure signal in the manifold (data bus) pushes the mobile wax post 16 and deflects its covering membrane 18 (FIG. 3A). This deflection can be erased by depressurizing the data bus and applying a second light illumination (FIG. 3B).

VYBAR 260 wax was chosen as the phase-change material 16 because of its low melting temperature (54° C.) and excellent mechanical strength in the solid state. Other suitable phase-change materials, however, may also be used. The response (melting) time of the VYBAR 260 wax actuator (650 µm diameter, 500 µm depth) on the glass substrate described above receiving a 100 mW illumination was around 2.5 s, which is comparable to or shorter than that of other phase-change based hydro-gel and paraffin valves.

The response time can be further shortened by, for example, reducing the size of the actuators or delivering increased light energy. For instance, if a 250 µm thick microscope cover glass is used as the substrate, both the depth and diameter of the phase-change media chamber can be scaled down by half (less wet etching undercut). The volume and thermal mass of the phase-change media plug will therefore shrink by 8-fold, and the melting time may be as short as 310 ms.

Membrane deflection increases with universal bus pressure. The deflection of an actuator cell on the plastic substrate described above (1200 µm diameter) and illuminated by the projector was measured. It achieved 500 µm under a moderate pressure of 100 kPa, which is significantly larger than most existing microactuator devices.

Pressure and light may only be required for switching the actuation status. Once the switching is complete, the latched actuators may maintain mechanical stability. During fluidic test, for example, the deflected and solidified VRBAR 260 wax blocked fluidic flow with 180 kPa hydraulic pressure without leaking. This good rigidity is desirable for practical uses. Also, the actuator is reusable and the activation-deactivation cycle in FIGS. 3A and 3B was repeated under different pressures.

Figure 4:
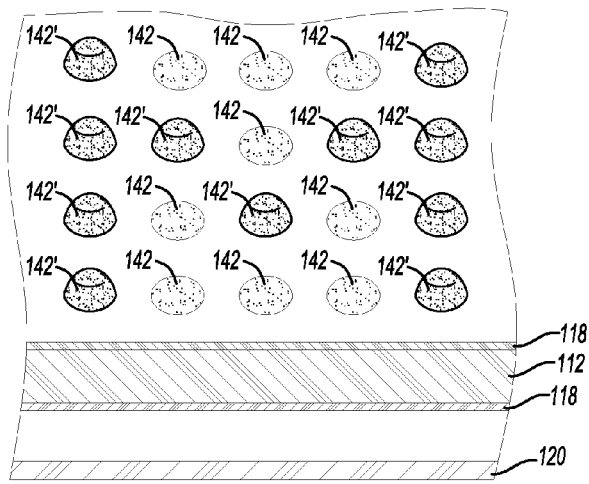
FIG. 4 is a perspective view of an embodiment of a microactuator system.

Referring to FIG. 4 where like numerals have similar descriptions, an array assembly 110 on COC plastic 112 (configured by a digital projector) is illustrated. Selected cells were actuated to display a letter "M."

Figure 5:
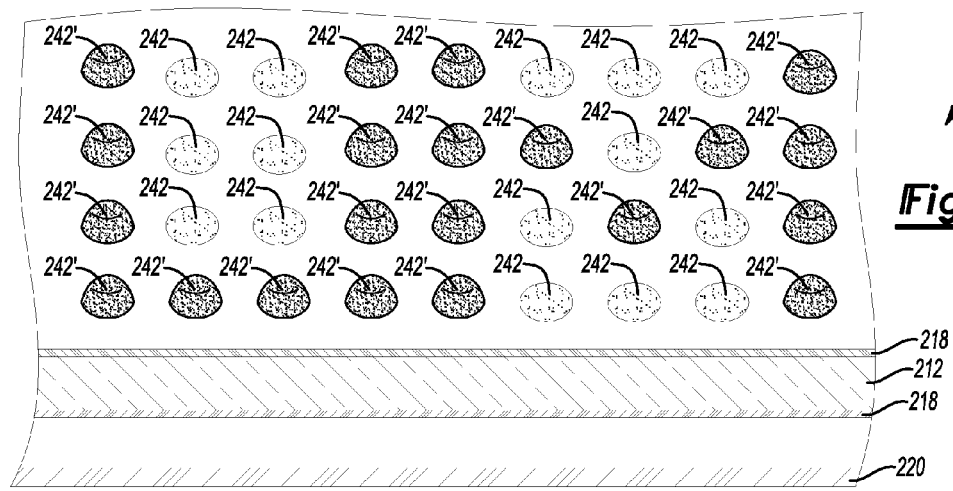
FIG. 5 is a perspective view of an embodiment of a microactuator system.

Referring to FIG. 5 where like numerals have similar descriptions, an array assembly 210 on a glass chip 212 (configured by a 100 mW laser pointer) is illustrated. Selected cells were actuated to display a "UM" pattern.

The configured patterns of FIGS. 4 and 5 maintained their integrity after the removal of light illumination and pressure supply. These microactuator arrays could then have been integrated with other devices and processes.

The 100 mW battery-powered laser pointer discussed above allows sequential addressing of individual array units (2.5 s for each unit). Automated operation is also possible with a motorized X-Y stage to move the laser pointer. This system implementation is simple and flexible, and is particularly suitable for processes with little complexity, low power applications and portable applications.

The digital projector can achieve simultaneous heating at multiple locations on a microchip, which is desirable for parallel operation and high throughput applications. The Infocus X2 projector has a luminous flux of 1700 Lumens, corresponding to 10-15 W radiant flux (white light). The heating power intensity increases with the converging ratio of the convex lens. For instance, to achieve the same wax melting speed as the laser pointer, the illumination field needs to be converged to approximately 0.7 cm×0.5 cm, and all the actuator units within this area can be configured in a 2.5 s illumination frame.

The operation of a variety of microfluidic devices, such as microvalves and micropumps, are essentially based on the deflection of elastic structures. The microactuator arrays described herein may generate large physical deflections/forces. They may be coupled with elastic microfluidic channels to achieve various fluidics functions. As an example, the actuator array configured by the 100 mW laser pointer was used to construct microvalves in PDMS microfluidic channels.

Referring to FIG. 6A, a ladder channel network 344 was configured by an actuator array (which is located behind the network 344). An array of fluidic cells 346 (short vertical lines) was alternately opened and closed by corresponding wax actuators 342, 342' at both ends of each of the cells 346. Dyed water from main fluidic channels 348, 350 (long horizontal lines) was completely blocked from the closed cells.

Referring to FIGS. 6B and 6C, close-up views of the activated and deactivated status of individual actuators 342, 342' are shown. In FIG. 6B, the wax plugs in the center column are pushed down (activated) and completely seal the center cell 346 from the dyed water (180 kPa hydraulic pressure). This activation was later erased by light illumination. The two actuators returned to their initial shape (FIG. 6C) and the water entered the center fluidic cell 346.

The fluidic channels 346 (50-100 µm wide, 20 µm deep) were made on a 200 µm thick PDMS slab using a heat-reflowed photoresist master. They have a bell shaped cross-section to facilitate complete closing by linear actuators.

The microactuator arrays described herein may be bonded or clamped to fluidic chips. These assemblies may be configured by electromagnetic radiation and pressure. Alternatively, the arrays may be preconfigured and later coupled with fluidic chips. This latched configuration allows fluidic channels and chambers to be made "normally open" or "normally closed," which may be desirable but otherwise difficult to implement for microfluidic devices.

The optically addressed microactuator arrays presented herein may be reusable and require very simple phase-change media loading and system implementation. They may further allow complete isolation between the phase-change media and the fluidic flow. The risk of sample contamination is therefore eliminated and sample heating is also minimized. Thermal simulation showed the temperature rise in the microfluidic channels when the phase-change media melts to be less than 10° C.

As discussed above, a microfluidic "flash memory" using phase-change materials and electromagnetic radiation enabled addressing was developed. The generated "virtual heaters" may provide a convenient and economic replacement of external solenoid valves, electrical modules, and/or on-chip electrical components required for conventional integrated microfluidic devices. Using a digital projector as a light source may allow simultaneous addressing of multiple units in an array without using multiplexing programs. A battery operated high power laser pointer may lead to a compact system with structural and operational simplicity.

The latched operation based on the use of phase-change media and universal bus pressure demonstrates energy efficiency and facilitates the integration of the actuator array with microfluidic devices. For instance, "normally closed" microfluidic channels can be implemented using the latched actuator. In addition, the latched operation may minimize the time for heat diffusion and fundamentally reduce the risk of thermal crosstalk in the array.

Certain of the microactuator arrays achieve large displacements/forces and the phase-change material may be completely encapsulated. It may therefore provide a safe, flexible, and low-cost fluidic engine for various lab-on-a-chip devices.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention. For example, (1) microactuators array have been demonstrated on glass and cyclo-olefin copolymer. A variety of other materials with medium or low thermal conductivity, such as many plastics, ceramics, PCB, epoxy resins, PDMS, etc., may also be used; (2) The PDMS membrane used to seal the chambers can be substituted with other flexible thin films such as latex, silicone rubber, polyurethane, etc. (3) In addition to VYBAR 260, other phase-change materials such as various kinds of waxes, hydrogel and sol-gel may also be used; (4) The electromagnetic radiation source is not limited to the image projector and laser pointer discussed above. Other devices, such as light-emitting diodes (LEDs), laser diodes, laser show tools, infrared beams, X-ray equipment, microwave equipment, etc., may also be used.

What is claimed:

1. A reconfigurable microactuator system comprising:
    a substrate having opposing outer surfaces and including a plurality of thru chambers formed therein;
    a plurality of plugs each disposed within one of the thru chambers, having opposing end surfaces, and configured to melt if heated;
    a flexible layer attached with the substrate and covering one of the end surfaces of each of the plugs and one of the opposing outer surfaces; and
    a cap, the flexible layer and cap arranged to form a common pressure chamber such that each of the plugs deforms, when melted, if subjected to pressure via the common pressure chamber.

2. The system of claim 1 wherein the flexible layer is impermeable to the plugs.

3. The system of claim 1 wherein the plugs comprise at least one of a wax, gel, polymer, and an alloy, wherein the alloy has a melting point less than 100° C.

4. The system of claim 1 further comprising another flexible layer attached with the substrate and covering the other of the end surfaces of each of the plugs.

5. The system of claim 1 wherein the thru chambers form an array on the substrate.

6. The system of claim 1 further comprising an electromagnetic radiation source arranged to provide electromagnetic radiation to a selected set of the plugs.

7. The system of claim 6 wherein the electromagnetic radiation source is a light source.

8. The system of claim 4 wherein the another flexible layer has at least one microchannel formed therein and wherein the microchannel is adjacent to at least one of the plugs.

9. The system of claim 8 wherein the at least one microchannel is concave in cross-section.

* * * * *